R. Rich,
Water Wheel.
No. 2,708. Patented July 8, 1842.
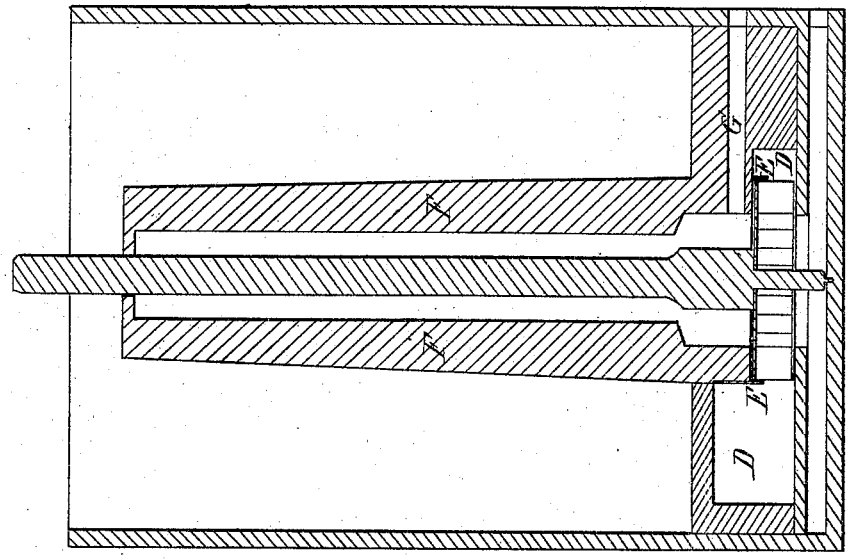
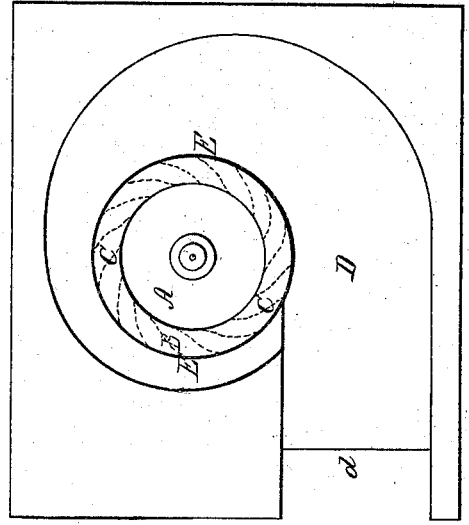
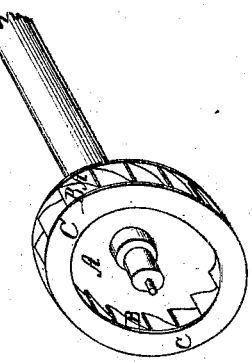

UNITED STATES PATENT OFFICE.

REUBEN RICH, OF ALBION, NEW YORK.

IMPROVEMENT IN WATER-WHEELS.

Specification forming part of Letters Patent No. 2,708, dated July 8, 1842.

*To all whom it may concern:*

Be it known that I, REUBEN RICH, of Albion, in the county of Oswego and State of New York, have invented a new and useful Improvement in Water-Wheels, which I denominate the "Pressure Center-Vent Water-Wheel;" and I hereby declare that the following is a full, clear, and exact description thereof, reference being had to the accompanying drawings, making a part of this specification, in which—

Figure 1 is a plan of the under side of the wheel and conductor; Fig. 2, a vertical section; Fig. 3, the wheel detached.

The nature of my invention consists in receiving the water onto the wheel at its periphery from the flume by a spiral conductor and discharging it as soon as it passes the buckets, thus giving the full action of the water and relieving the wheel of its weight as soon as it passes that point.

The wheel, formed of iron or other suitable substance, when running horizontal has its upper face formed of a flat plate A just the size of the wheel. Around its outer edge there is a series of ogee-formed buckets B, extending downward at right angles to its under side and obliquely to the radii, overlying each other to any distance desired. A ring C is attached to the lower edge of these buckets, which is wide enough to reach from their outer to their inner edge and leaving the center open for the free egress of the water. The vertical shaft passes through the center of the top plate A and is firmly attached thereto. The wheel so constructed is surrounded by a spiral conductor D to convey the water from the flume onto it. The space between this conductor and the wheel, gradually contracting in width and height from the entrance at $d$ around the whole circumference of the wheel, has a tendency to press the water toward the center. From the top of this conductor a flange E projects down around the wheel as close as possible without touching the thickness of the upper plate and prevents the water from running in over the wheel. A tube F surrounds the shaft, extending up above the water-line, and in the side of this tube, just over the wheel, there is an aperture G, which opens outside of the flume for conducting off any water that may leak in over the wheel, and thus prevents it becoming clogged.

Operation: When the water is let onto this wheel, the spiral serves to create an equal pressure toward the center of the wheel on all sides, and, acting on the buckets while passing through them, relieves the wheel of its weight as soon as it passes the inner edge of the ring C, falling down and passing off freely from the center.

What I claim as my invention, and desire to secure by Letters Patent, is—

The combination of the wheel, constructed as hereinbefore described, with the spiral conductor D and tube F, so as to get the full pressure of the water while the wheel is relieved of its weight, in the manner and for the purpose set forth.

REUBEN RICH.

Witnesses:
J. J. GREENOUGH,
G. R. WEST.